US011134103B2

(12) United States Patent
Kunz et al.

(10) Patent No.: US 11,134,103 B2
(45) Date of Patent: Sep. 28, 2021

(54) METHOD OF ENABLING SLICE SECURITY SEPARATION

(71) Applicant: NEC Corporation, Tokyo (JP)

(72) Inventors: Andreas Kunz, Heidelberg (DE); Anand Raghawa Prasad, Tokyo (JP); Naoaki Suzuki, Tokyo (JP); Hironori Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 16/096,602

(22) PCT Filed: Apr. 27, 2017

(86) PCT No.: PCT/JP2017/016782
§ 371 (c)(1),
(2) Date: Oct. 25, 2018

(87) PCT Pub. No.: WO2017/188392
PCT Pub. Date: Nov. 2, 2017

(65) Prior Publication Data
US 2019/0141081 A1     May 9, 2019

(30) Foreign Application Priority Data

Apr. 29, 2016   (EP) .................................... 16275069

(51) Int. Cl.
*H04L 29/06*   (2006.01)
*H04W 4/70*    (2018.01)
(Continued)

(52) U.S. Cl.
CPC ............. *H04L 63/20* (2013.01); *H04W 4/70* (2018.02); *H04W 8/04* (2013.01); *H04W 12/06* (2013.01);
(Continued)

(58) Field of Classification Search
CPC ...... H04L 63/20; H04W 12/06; H04W 12/08; H04W 16/02; H04W 48/18; H04W 4/70;
(Continued)

(56) References Cited

U.S. PATENT DOCUMENTS 7,904,940 B1 *   3/2011   Hernacki ............... G06F 21/57
                                                    709/224
2014/0302820 A1* 10/2014   Jones ................ H04W 12/0609
                                                    455/411
(Continued)

FOREIGN PATENT DOCUMENTS

JP   2016-504776 A    2/2016
WO   2015/068497 A1   5/2015

OTHER PUBLICATIONS

Qian (Clara) Li et al: "End-to-end Network Slicing in 5G Wireless Communication Systems." ETSI Workshop on Future Radio Technologies—Air Interfaces, Jan. 28, 2016 (Jan. 28, 2016), pp. 1-4, XP055395445, Retrieved from the Internet: RL:https://www.google.de/url?sa=t&rct=j&q=&esrc=s&source=web&cd=2&ved=OahUKEwjJ4viDr7jVAhVIZIAKHVkBvUQFggzMAE&url=https%3A%2F%2Fdocbox.etsi.org%2FWorkshop%2F2016%2F201601_FUTURERADIOTECHNOL_WORKSHOP%2FS06_ADVANCED_TOPIC_FUTURE_AIR_ITNTERFACES%2FEND2END_NWK_SLICING_5G_WIRELESS_COMM_SYSTEMS_paper.pdf&usg, [retrieved on Aug. 2, 2017].

(Continued)

*Primary Examiner* — Joseph P Hirl
*Assistant Examiner* — Ka Shan Choy (57) ABSTRACT

A mobile network system comprises a security device and a network device. The security device stores slice security requirements which are different for each slice ID (identification). The slice ID indicates a network slice in a core network. The network device transmits, to the security device, a Slice Security Request including the slice ID. The (Continued)

Attach Procedure with one RRC connection for all slices network device receives, from the security device, a Slice Security Response including the slice security requirements related to the slice ID. The network device selects, based on the slice security requirements, a security algorithm for the network slice.

4 Claims, 8 Drawing Sheets

(51) Int. Cl.
| | |
|---|---|
| *H04W 12/06* | (2021.01) |
| *H04W 12/08* | (2021.01) |
| *H04W 48/18* | (2009.01) |
| *H04W 76/11* | (2018.01) |
| *H04W 76/27* | (2018.01) |
| *H04W 8/04* | (2009.01) |
| *H04W 60/00* | (2009.01) |
| *H04W 16/02* | (2009.01) |

(52) U.S. Cl.
CPC ........... *H04W 12/08* (2013.01); *H04W 48/18* (2013.01); *H04W 60/00* (2013.01); *H04W 76/11* (2018.02); *H04W 76/27* (2018.02); *H04W 16/02* (2013.01)

(58) Field of Classification Search
CPC ..... H04W 60/00; H04W 76/11; H04W 76/27; H04W 8/04
See application file for complete search history.

(56) References Cited

U.S. PATENT DOCUMENTS

| | | | |
|---|---|---|---|
| 2017/0013453 A1* | 1/2017 | Lee | H04W 12/041 |
| 2017/0303259 A1* | 10/2017 | Lee | H04W 12/08 |
| 2017/0311278 A1* | 10/2017 | Adjakple | H04W 68/005 |
| 2018/0375961 A1* | 12/2018 | Wang | H04L 12/4633 |
| 2019/0166493 A1* | 5/2019 | You | H04W 12/037 |

OTHER PUBLICATIONS

Remi Harel et al: "5G security recommendations Package #2: Network Slicing Project: NGMN—5G Security", Apr. 27, 2016 (Apr. 27, 2016), pp. 1-12, XP055395449, Retrieved from the Internet: URL:https://www.ngmn.org/uploads/media/160429_NGMN_5G_Security_Network_Slicing_v1_0. pdf, [retrieved on Aug. 2, 2017].

Malla Reddy Sama et al: "Reshaping the mobile core network via function decomposition and network slicing for the 5G Era", 2016 IEEE Wireless Communications and Networking Conference, IEEE, Apr. 3, 2016 (Apr. 3, 2016). pages 1-7, XP032959005, DOI: 10.1109/WCNC.2016.7564652; [retrieved on Sep. 12, 2016].

International Search Report corresponding to PCT/JP2017/016782, dated Aug. 11, 2017, 3 pages.

Japanese Office Action for JP Application No. 2018-554602 dated Mar. 31, 2021 with English Translation.

* cited by examiner

METHOD OF ENABLING SLICE SECURITY SEPARATION

CROSS-REFERENCE TO RELATED APPLICATIONS

This application is a national stage application of International Application No. PCT/JP2017/016782 entitled "METHOD OF ENABLING SLICE SECURITY SEPARATION," filed on Apr. 27, 2017, which claims the benefit of the priority of European Patent Application No. 16275069.9 filed on Apr. 29, 2016, the disclosures of each of which are hereby incorporated by reference in their entirety.

TECHNICAL FIELD

The present invention relates to a method to enable a different security setting on a per slice basis for a single device in a mobile communication network.

BACKGROUND ART

Current mobile communication networks do not consider the concept of "slicing", i.e. providing isolated resources throughout the whole network for a particular service. Current technical report TR 23.799 (3GPP TR 23.799 V0.2.0 (2016-2), Study on Architecture for Next Generation System (Release 14)) studies the key issue on the support of network slicing.

Figure 1:
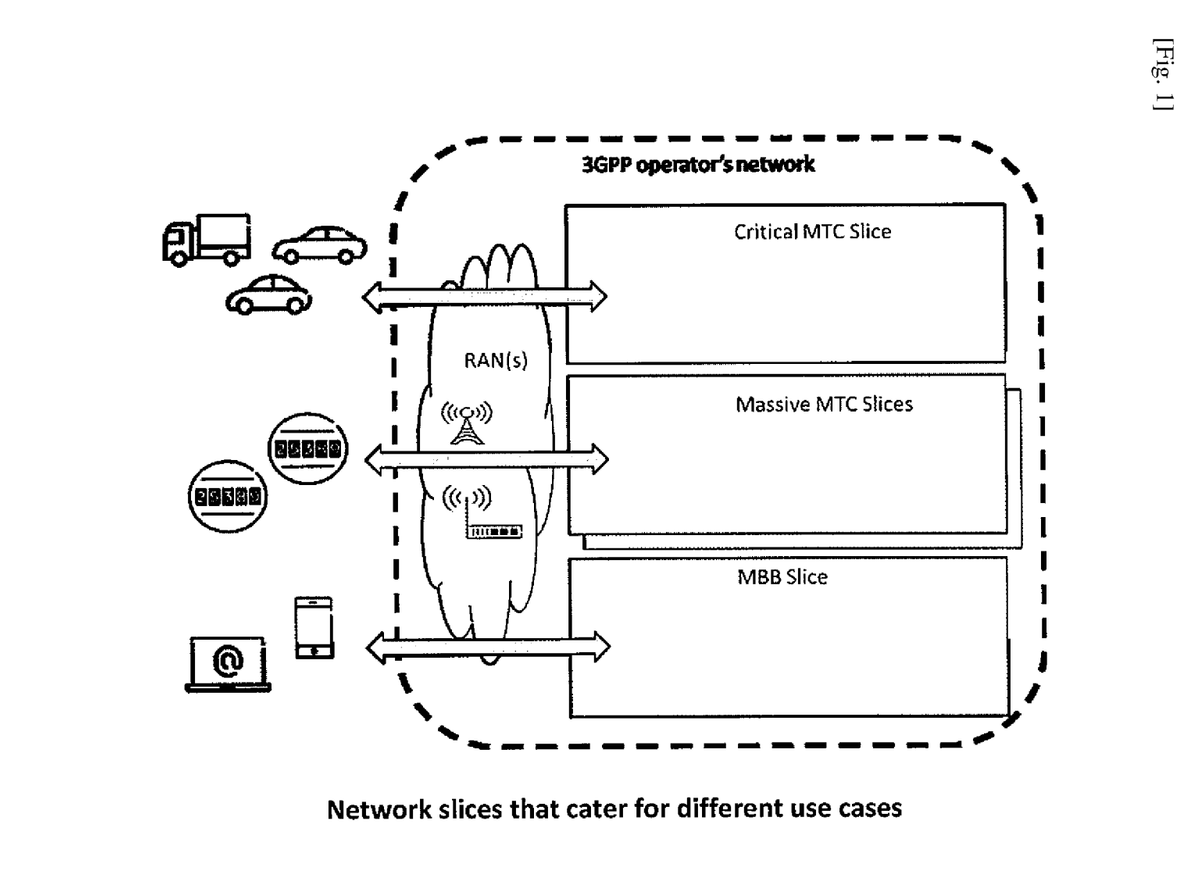
FIG. 1 corresponds to FIG. 5.2-1 of TS 22.891 and illustrates network slices that cater for different use cases.

FIG. 1 corresponds to FIG. 5.2-1 of TS 22.891 and illustrates network slices that cater for different use cases.

SUMMARY OF INVENTION

Technical Problem

Each service on a different network slice has different requirements including different security requirements, while one individual terminal may access to one or more services at same time. The introduction of this new concept leads to several problems in the legacy system which needs to be solved, also with respect to the future next generation system. Current mobile network would not allow the concept and it leads following problems:
1) According to the current 3GPP standard it is not possible to apply different security algorithms, procedures and/or settings which are corresponding to security requirements depending on a network slice serving certain service; and
2) Currently it is not possible to apply one or more set of different security algorithms, procedures and/or settings which are corresponding to security requirements depending on a network slice serving certain service at the same time for one individual terminal.

Also current mobile networks do not allow a single UE to have different security algorithms for different data bearers at the same time over the same eNB.

Solution of Problem

Accordingly, preferred embodiments of the present invention aim to provide methods and apparatus which address or at least partially deal with the above problems.

As one aspect of the present invention, a security device used in a mobile network comprising: a memory to store slice security requirements which are different for each slice ID, the slice ID indicating a network slice in a core network; and a transmitter to transmit the slice security requirements to a network device used in the mobile network in response to a request for selecting a security algorithm for the network slice is provided.

As another aspect of the present invention, a network device used in the mobile network comprising: a transmitter to transmit, to a security device used in the mobile network, a Slice Security Request including a slice ID which indicates a network slice in a core network; a receiver to receive, from the security device, a Slice Security Response including slice security requirements related to the slice ID; and a controller to select, based on the slice security requirements, a security algorithm for the network slice is provided.

As another aspect of the present invention, a mobile network system comprising: a security device; and a network device; wherein the security device is configured to store slice security requirements which are different for each slice ID, the slice ID indicating a network slice in a core network, and the network device is configured to transmit, to the security device, a Slice Security Request including the slice ID, to receive, from the security device, a Slice Security Response including the slice security requirements related to the slice ID, and to select, based on the slice security requirements, a security algorithm for the network slice is provided.

As another aspect of the present invention, a security separation method for a security device used in a mobile network, the method comprising: storing slice security requirements which are different for each slice ID, the slice ID indicating a network slice in a core network; and transmitting, to a network device used in the mobile network, the slice security requirements in response to a request for selecting a security algorithm for the network slice is provided.

As another aspect of the present invention, a security separation method for a network device used in the mobile network, the method comprising: transmitting, to a security device used in the mobile network, a Slice Security Request including a slice ID which indicates a network slice in a core network; receiving, from the security device, a Slice Security Response including slice security requirements related to the slice ID; and selecting, based on the slice security requirements, a security algorithm for the network slice is provided.

As another aspect of the present invention, a security separation method for a mobile network system including a security device and a network device, the method comprising: storing, by the security device, slice security requirements which are different for each slice ID, the slice ID indicating a network slice in a core network; transmitting, by the network device, a Slice Security Request including the slice ID to the security device; receiving, by the network device, a Slice Security Response including the slice security requirements related to the slice ID from the security device; and selecting, by the network device, based on the slice security requirements, a security algorithm for the network slice is provided.

As another aspect of the present invention, an authentication method for a mobile network system including a security device as part of a network device, the method comprising: storing slice security requirements which are different for each slice ID, the slice ID indicating a network slice in a core network; and selecting, based on the slice security requirements, a security algorithm for the network slice is provided.

DESCRIPTION OF EMBODIMENTS

Each solution is described in a general way and in a more specific embodiment to as an example how to apply the invention to a 3GPP network. Even if the described solution is foreseen to be used in a 3GPP mobile network, using GSM, GPRS, UMTS, HSPA, LTE, LTE-A access, but it is not limited to such a network and could be used in the same way for any other cellular or mobile network, e.g. CDM2000, Bluetooth, IEEE 802.11 variants, ZigBee etc., i.e. any access technologies and core network technologies. The described protocol options are considered to be DIAMETER, GTP, MAP, SIP, but could be any other as well like HTTP, XCAP, RADIUS etc. The new Slice Security Server can be a separate entity but can be also collocated with any other entity e.g. the MME, HSS, SGW, SGSN, GGSN, SCEF, MTC-IWF, PGW, Network Management System or the Slice Manager, etc.

Figure 2:
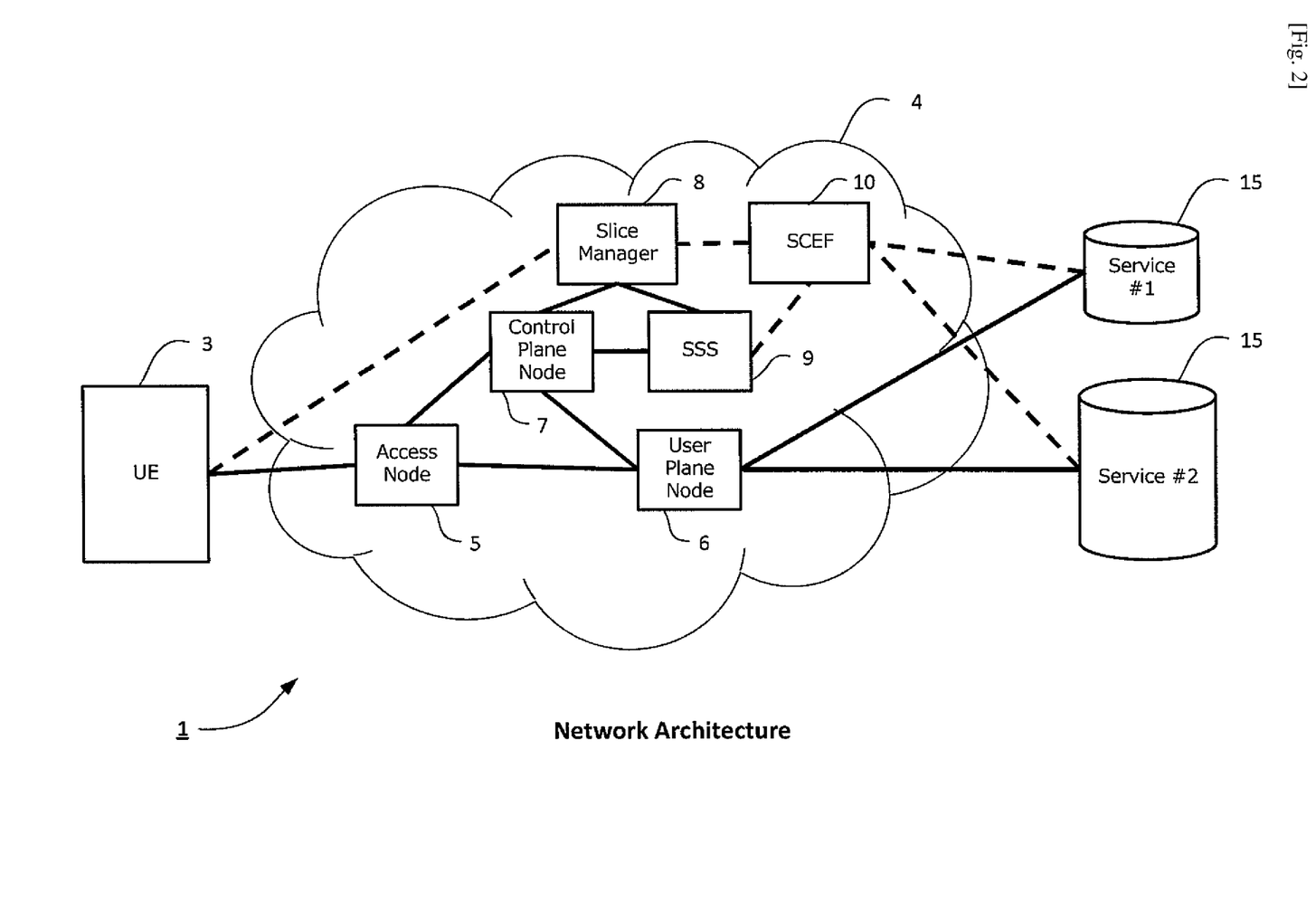
FIG. 2 illustrates an exemplary network architecture to which embodiments of the invention may be applied.

FIG. 2 illustrates an exemplary network architecture to which embodiments of the invention may be applied.

Figure 3:
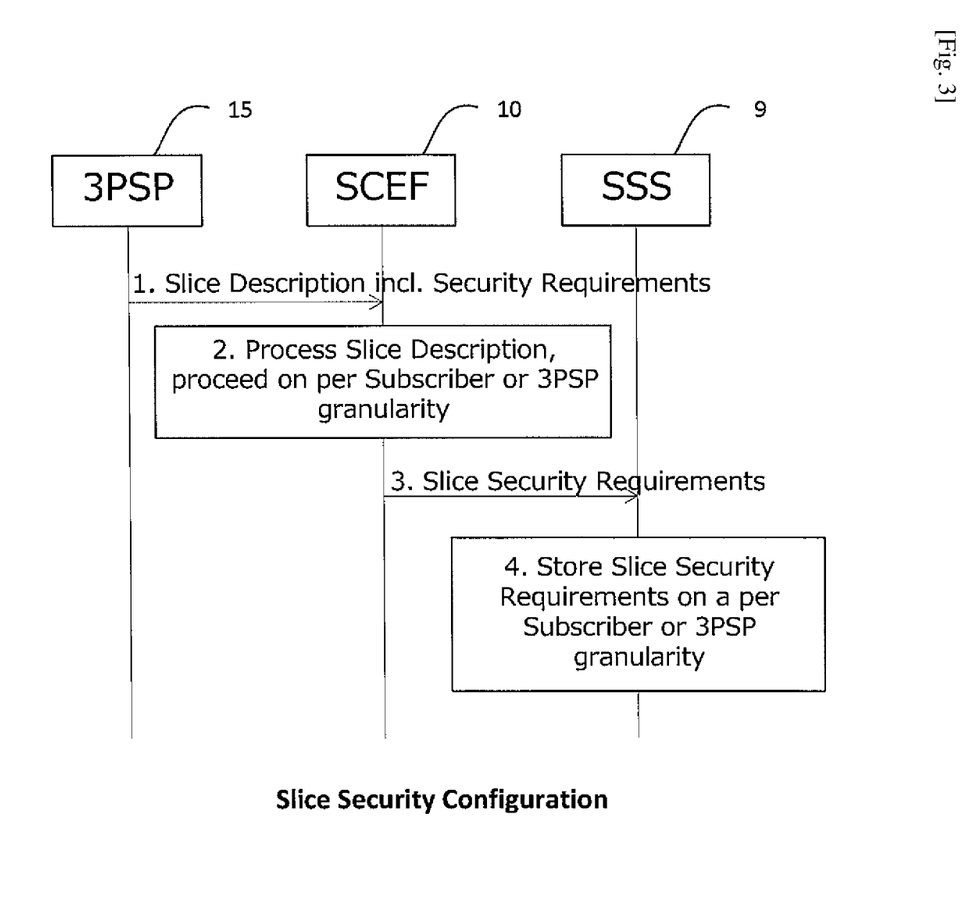
FIG. 3 illustrates how to provide, on a per 3PSP basis, a detailed enough slice description including corresponding security requirements to the network.

For a 3GPP system, the used basic terminology may map in the following way:
Radio Access Entity (RAE)=eNB/NodeB
Control Plane Entity (CPE)=MME/SGSN
User Plane Entity (UPE)=SGW/PGW/SGSN/GGSN
Slice Security Server (SSS)=HSS/AuC
3rd Party Service Provider (3PSP)=SCS/AS As a prerequisite, the 3PSP needs to provide a detailed enough slice description including corresponding security requirements to the network. There are two options possible for the configuration:
1) on a per subscription basis
2) on a per 3PSP basis Option 1) requires that the network is able to resolve the subscriptions that are affected with the request from the 3PSP. This could be done e.g. with a former binding in the network in the subscription information with the 3PSP or service ID. The network would be required to update the subscription information for this service ID/3PSP every time the 3PSP provides changes or updates.

Option 2) requires that the network only keeps 3PSP or service ID related information and performs at a later stage whether a terminal is affected or not. An example call flow is shown in FIG. 3. In this case an update mechanism is required to inform terminals with ongoing sessions that are matter of this modification. The data management is easier since a lookup of the information is performed per UE only when it is required.

The security requirements sent by the 3PSP may be on a very high level, e.g. low security, medium, high security, or more detailed, indicating special procedures and or algorithms, e.g. MILENAGE, KASUMI; UEA2, UIA2, EEA3, EIA3, TUAK, GEA3, GEA4, GIA4, GEA4, GIA5 etc. . . . The security requirements could also represent a pointer to a predefined security profile that was acknowledged beforehand with the 3PSP and the network and the 3PSP is able to choose between different profiles.

This configuration exchange is done via the SCEF as shown in FIG. 3, which tries to cover both options described above. The exemplary slice security configuration procedure shown in FIG. 3 includes the following steps:

Step 1: The 3PSP provides a slice description including the corresponding security requirements to the SCEF. The slice description may contain information about the concerned subscribers, the type of service (service ID), slice ID, QoS requirements, security requirements, mobility, activity time interval, validity time, protocol options, service provider preferences etc.

Step 2: The SCEF processes the slice description and translates it into an understandable format for the network. Based on the information available, the SCEF may resolve the affected subscribers of this slice. This depends on whether the 3PSP slice description message is handle on a per subscription or 3PSP basis/service ID.

Step 3: The SCEF provides the slice security requirements to the SSS. Based on the information available in the SCEF or based on operator policies, the SCEF may provide this information per subscriber or on a 3PSP/service ID granularity (e.g. slice #41 from 3PSP Google representing Service ID #22 corresponding to YouTube).

Step 4: The SSS stores this information on a per subscriber or 3PSP/service ID granularity, depending on the information received and the operator policies.

Acknowledgements are not shown in this call flow, the slice creation and assignment of the slice ID is performed in advance to this flow.

Instead of provisioning the slice security requirements from the 3PSP to the SSS it is also possible to preconfigure them e.g. with OAM procedures or manually in the SSS, but this may be less dynamic from 3PSP point of view.

As another prerequisite the UE must be preconfigured with the slice IDs to be used and those must match to the ones configured in the network. This configuration may be done with a special configuration server in the operator network using XCAP, OMA DM etc., or via the 3PSP directly over the top. In case of a configuration server in the operator network, the 3PSP must provide the configuration and the affected TEs to the mobile operator, preferably via the SCEF. The configuration server may be the Slice Manager, who resolves the affected UEs and updates their configuration as well as the corresponding subscription profiles.

Figure 4:
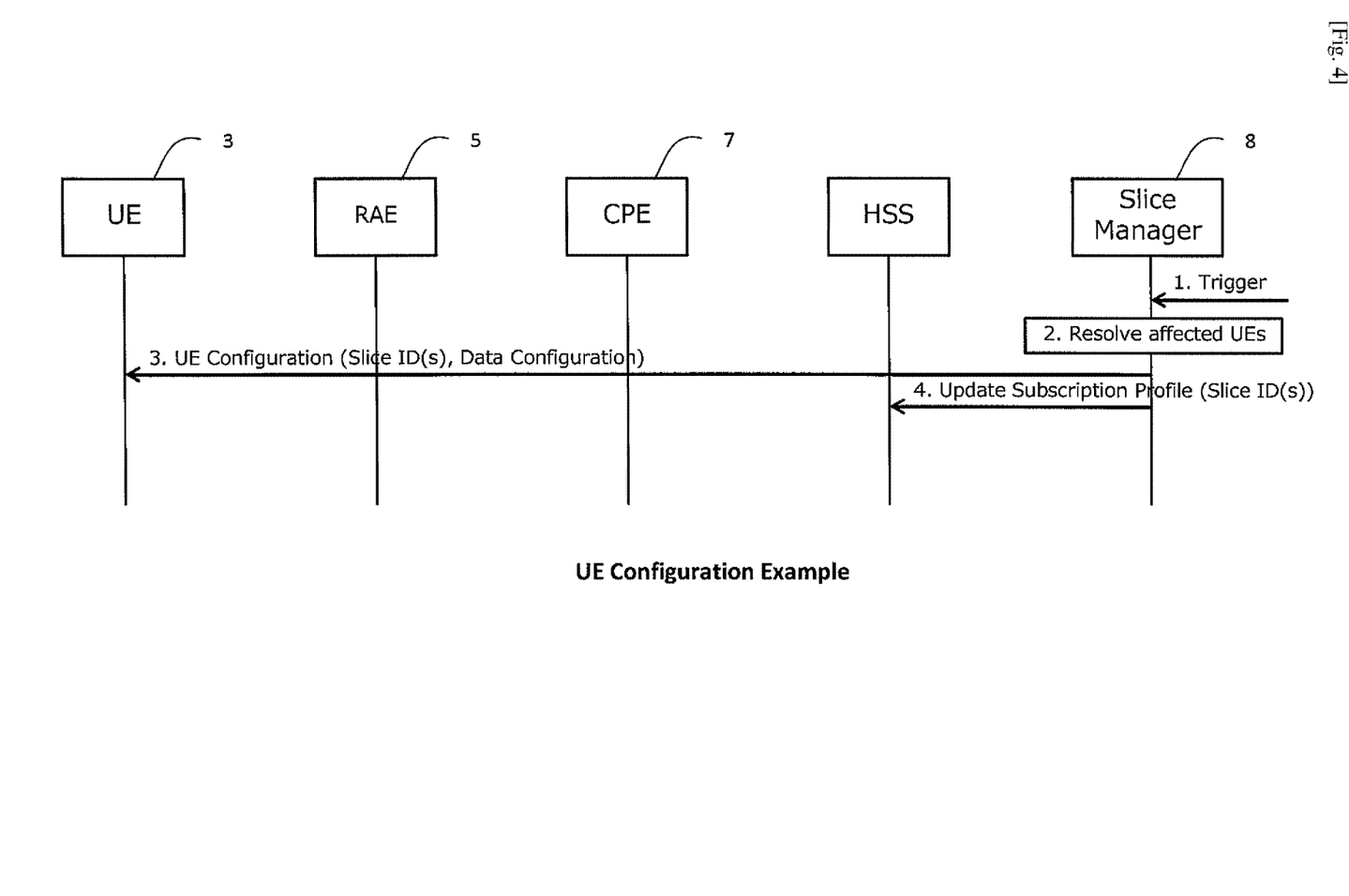
FIG. 4 illustrates an exemplary signaling diagram for UE configuration.

FIG. 4 illustrates an exemplary signaling diagram for UE configuration. As shown, the Slice Manager is taking care of every other aspects of the slice (QoS, Subscriber handling, validity time, resource planning etc.). The Slice Manager may be collocated with the SSS.

Figure 5:
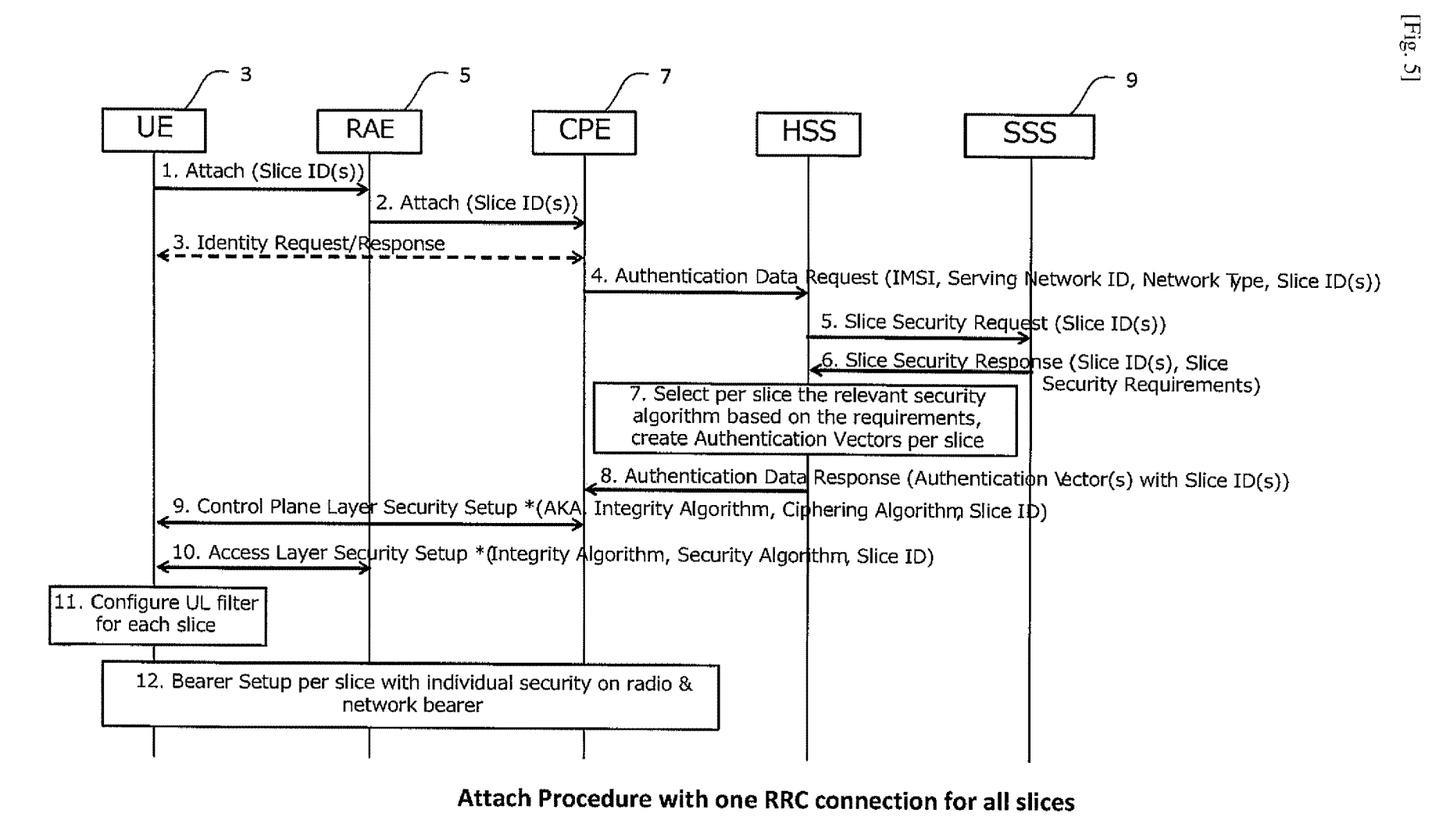
FIG. 5 illustrates an exemplary signaling diagram for an Attach procedure with one RRC connection for all slices.

The solution of the above described problem may be achieved in two different ways, depending on the implementation of the RRC protocol:
Solution 1: One RRC connection for all slices
Solution 2: One RRC connection per slice
In the following only solution 1 is shown in details in the following, solution 2 would simply require repeating all messages per slice.
Solution 1: One RRC Connection for all Slices FIG. 5 illustrates an exemplary signaling diagram for an Attach procedure with one RRC connection for all slices. As a prerequisite the UE must be preconfigured with the slice IDs to be used and those must match to the ones configured in the network. The Slice Security Server (SSS) is a repository for the different slice security requirements and provides those to the HSS on request for selecting the appropriate security algorithm per slice. The SSS may be collocated with the HSS. The procedure includes the following steps:

Step 1: The UE sends an Attach Request to the RAE including a list of all desired slice ID. The UE may include a list of all desired service ID instead of the list of slice ID. If the service choice is done by the network, then the UE will not include any service ID or slice ID, but it need to send a slice capability flag to indicate that the UE is enhanced for handling slices with different security associations.

Step 2: The RAE selects the CPE and forwards the Attach Request including the list of slice ID/service ID or the slice capability flag.

Step 3: The CPE may request the UE identity.

Step 4: The presence of the slice ID/service ID list or the slice capability flag is indicating the CPE the UE capability to handle several slices with different security requirements. The CPE requests the Authentication Data from the HSS and includes the list of requested slice IDs/service IDs, if available. In case the service choice is done by the network, the CPE will retrieve the relevant information for taking a decision in step 8. The CPE may further check based on the subscription profile whether the UE is eligible to access to the network slice(s) associated with the list of slice ID/service ID, if available.

Step 5: The HSS sends a Slice Security Request to the SSS including the slice ID/service ID list received from the CPE, if available. If no slice IDs/service IDs are indicated in the message from the CPE, then the HSS checks the subscription profile whether the terminal subscribed to any specific services that require special treatment and includes them (i.e. subscribed slice IDs/service IDs) in the request to the SSS. The SSS may be collocated with the HSS, then this step and step 6 are executed internally.

Step 6: The SSS provides the security requirements per slice ID/service ID. If the SSS does not have the security requirements for a particular slice ID/Service ID, it will derive or lookup the 3PSP address and query the security requirements directly or via the SCEF. The security requirements could already indicated the algorithm to be used or indicate a level, e.g. high security, middle security, low security, or they could point to a predefined security profile out of a set of predefined profiles, which are preferably known to the 3PSP. Those predefined security profiles could be available in all network nodes, i.e. known to all CPEs and RAEs, HSS etc., so that only a pointer to the profile ID is required in the security requirements.

Step 7: According to the received security requirements, the HSS executes the security procedures per slice and selects the corresponding security algorithms per slice. The HSS may take the UE capabilities into account as well as the operator policies. Under the security procedures, the HSS creates individual Authentication Vectors per slice and creates a binding with the corresponding slice IDs/service IDs. In case only one NAS connection is used to manage all slices, then the HSS includes also an authentication vector for the NAS security, independent of the slice security authentication vectors.

Step 8: The HSS sends the set of Authentication Vectors and slice IDs/service IDs to the CPE in the Authentication Data Response. If security profiles are used, then the HSS may need to send only the security profile ID/slice ID set instead of the full authentication vector per slice.

Step 9: The CPE sets up the Control Plane layer security per slice and performs authentication and key agreement (AKA). The messages exchanged may map to the "NAS security mode command message" from MME to UE and may not belong to any slice and shall contain the UE security capabilities and per slice ID/service ID the selected algorithms for ciphering and integrity, or the security profile ID. The UE verifies the integrity of the message from the CPE and starts integrity protection and ciphering/deciphering with this security context and sends an acknowledgement message to CPE ciphered and integrity protected. This acknowledgement may map to the "NAS security mode complete" message from the UE to the MME.

Step 10: The RAE sets up the radio access layer security for user plane and control plane and sends the selected algorithms for integrity and ciphering per slice. The messages exchanged here may map to the "AS security mode command message" from eNB to UE and to the "AS security mode complete message" from UE to eNB.

Step 11: The UE configures the uplink filters in order to map uplink traffic from the application to the right Data Radio Bearers (DRB) on the corresponding slices.

Step 12: The UE finalizes the bearer setup per slice towards the UPE with individual security.

If a UE would like to attach to a slice not included in the ATTACH request of step 1, then the UE would be required to send another ATTACH request with the slice ID it would like to be attached to. The CPE detects that the UE is already attached to the network and would not perform a challenge-response with the UE, but still query the SSS for the security requirements of the slice. This is not possible if the service choice is done by the network, since the UE would not include any slice ID.

In another embodiment, the HSS may ask the 3PSP directly, or via SSS, or via SCEF or both for the security requirements on a per UE basis, i.e. the 3PSP does not need to preprovision the SSS with security requirements but signaling traffic may be increased.

Solution 2: One RRC Connection Per Slice

In case the one RRC connection per slice is used, i.e. the UE would setup a separate radio signaling bearer for each slice independently. As a consequence the UE would send separate Attach requests for each slice. As a result authentication and control plane as well as radio access security is setup separately as well as the NAS signaling per slice. Each slice could be considered as a Virtual Machine inside the UE, acting completely independently to the other slices.

Summary

Beneficially, the above described exemplary embodiments include, although they are not limited to, one or more of the following functionalities.

1) New SSS Functionality:
  a. SSS stores security requirements from the 3PSP for a particular service/slice.
  b. SSS creates a binding between the security requirements and the service/slice IDs c. SSS gets queried from the HSS to lookup the security requirements for requested slice/service IDs d. For unknown slice/service IDs, the SSS can derive or lookup the 3PSP address and query the corresponding security requirements, e.g. via SCEF 2) New UE Functionality:
 a. UE includes either slice capabilities (service selection done by network) or slice/service IDs in the Attach request (service selection done by UE).
 b. UE uses either a single RRC/NAS connection for all slices or one RRC/NAS connection per slice.

3) New CPE/HSS Functionality:
 a. HSS selects security algorithms and authentication vectors per slice and for the NAS/RRC connection if shared by multiple slices
 b. HSS validates slice/service request based on subscription information
 c. HSS, CPE and RAE may use preconfigured security profiles instead of full authentication vectors.

It can be seen that the above embodiments describe a method for slice security separation comprising:

1) UE Provisioning of Slice Security requirements from the 3PSP to the SSS;
2) During the provisioning, SECF translates a slice description to Slice Security requirements per subscription or 3PSP basis/service ID;
3) Indicating at time of ATTACH the requested slice IDs/service IDs by the UE (or the subscribed slice IDs/service IDs by the HSS);
4) Request of Slice Security requirements for each slice from the SSS;
5) Based on given Slice Security requirements per slice, HSS provides an authentication vector or an security profile per slice;
6) Selection of algorithms for integrity and ciphering and procedures based on Slice Security requirements; and
7) Provisioning of security parameters sets per slice for control plane and radio access layer.

Benefits

It can be seen that the above embodiments provide a number of benefits, including, but not limited to the possibility to provide different security modes per slice associated with a single terminal.

System Overview

FIG. 2 schematically illustrates a mobile (cellular or wireless) telecommunication network 1 in which users of mobile devices, such as user equipment (UE) 3 can communicate with each other and other users via base stations/access nodes 5 and an associated (radio access/core) network 4 using an appropriate radio access technology (RAT), e.g. E-UTRA. As those skilled in the art will appreciate, whilst one UE 3 and one access node 5 are shown in FIG. 2 for illustration purposes, the system, when implemented, will typically include other access nodes/base stations and mobile devices.

In this network 4, network slicing is provided as described above. Moreover, the network 4 beneficially allows slice security separation to provide support for different security requirements associated with different services.

As can be seen, the network includes an access node 5, a user plane node 6, a control plane node 7, a slice manager 8, a slice security server (SSS) 9, a service capability exposure function (SCEF) 10, amongst others. Various services may be provided using one or more application servers 15.

User Equipment

Figure 6:
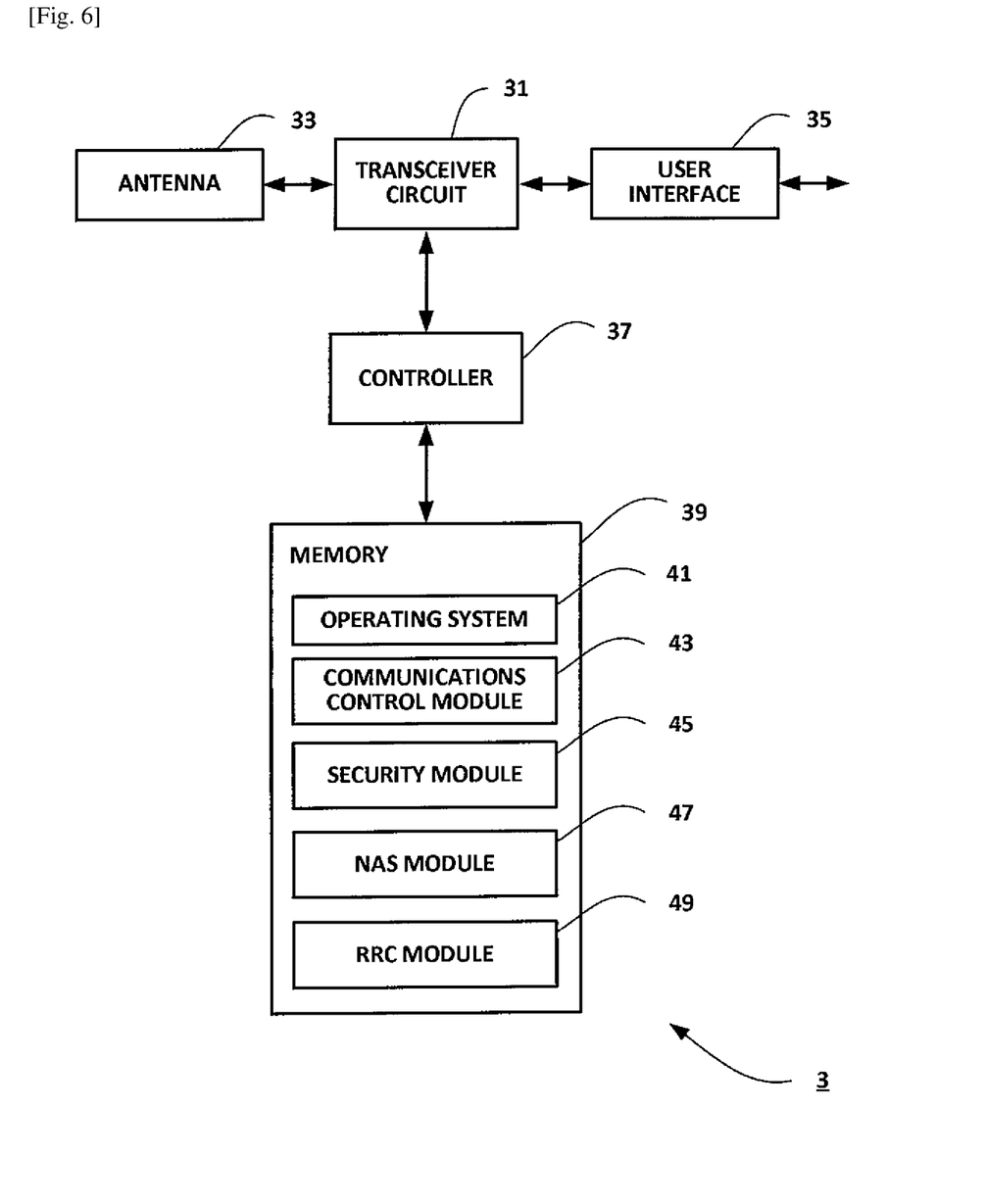
FIG. 6 is a block diagram illustrating the main components of the user equipment (UE) 3 shown in FIG. 2.

FIG. 6 is a block diagram illustrating the main components of the user equipment (UE) 3 shown in FIG. 2. As shown, the UE 3 has a transceiver circuit 31 that is operable to transmit signals to and to receive signals from a base station (e.g. 'Access Node' 5 in FIG. 2) via one or more antenna 33. The UE 3 has a controller 37 to control the operation of the UE 3. The controller 37 is associated with a memory 39 and is coupled to the transceiver circuit 31. Although not necessarily shown in FIG. 6, the UE 3 will of course have all the usual functionality of a conventional mobile device (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the UE 3 by, in this example, program instructions or software instructions stored within memory 39. As shown, these software instructions include, among other things, an operating system 41, a communications control module 43, a security module 45, a NAS module 47, and an RRC module 49.

The communications control module 43 controls the communication between the UE 3 and the base station/access node 5. The communications control module 43 also controls the separate flows of control data (Control Plane) and user data (User Plane, both uplink and downlink) that are to be transmitted to the base station/access node 5 and other nodes (via the base station/access node) such as the control plane node 7 and/or the 3PSP 15.

The security module 45 is responsible for applying one or more set of appropriate security algorithms, procedures and/or settings corresponding to security requirements associated with the various network slices (e.g. per service).

The NAS module 47 is operable to generate, send and receive signalling messages formatted according to the NAS protocol. The NAS messages may include, for example, the NAS messages comprising control data relating to mobility of the UE 3, e.g. control data for attaching the UE 3 to the network and/or for setting up security for the UE 3 (per slice, if appropriate).

The RRC module 49 is operable to generate, send and receive signalling messages formatted according to the RRC standard. The RRC messages may include, for example, messages relating to the random access procedure and/or the RRC connection establishment/reconfiguration, UE configuration, and the RRC messages may also include messages comprising control data (e.g. NAS messages) to be relayed by the serving base station access node 5 to other network nodes.

Slice Manager

Figure 7:
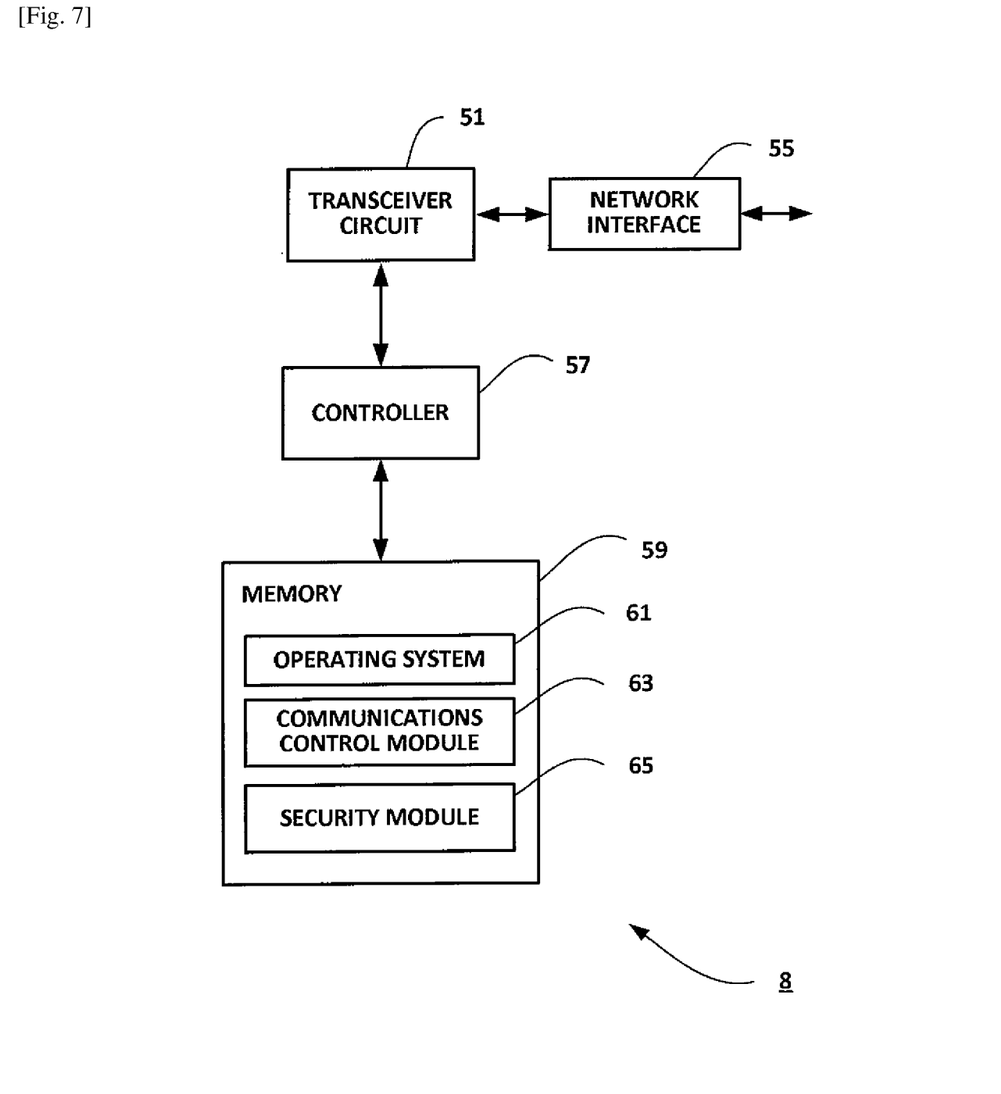
FIG. 7 is a block diagram illustrating the main components of the slice manager 8 shown in FIG. 2.

FIG. 7 is a block diagram illustrating the main components of the slice manager 8 shown in FIG. 2. As shown, the slice manager 8 has a transceiver circuit 51 and a network interface 55 for transmitting signals to and for receiving signals from other network nodes (including the UE 3). The slice manager 8 has a controller 57 to control the operation of the slice manager 8. The controller 57 is associated with a memory 59.

Software may be pre-installed in the memory 59 and/or may be downloaded via the communication network 1 or from a removable data storage device (RMD), for example. The controller 57 is configured to control the overall operation of the slice manager 8 by, in this example, program instructions or software instructions stored within memory 59. As shown, these software instructions include, among other things, an operating system 61, a communications control module 63, and a security module 65.

The communications control module 63 controls the communication between the slice manager 8 and other network entities that are connected to the slice manager 8 (e.g. the base station/access node 5, the control plane node 6, the HSS, the SSS 9, and the UE 3 when connected to the base station/access node 5).

The security module 65 is responsible for applying one or more set of appropriate security algorithms, procedures and/or settings corresponding to security requirements associated with the various network slices (e.g. per service).

Slice Security Server

Figure 8:
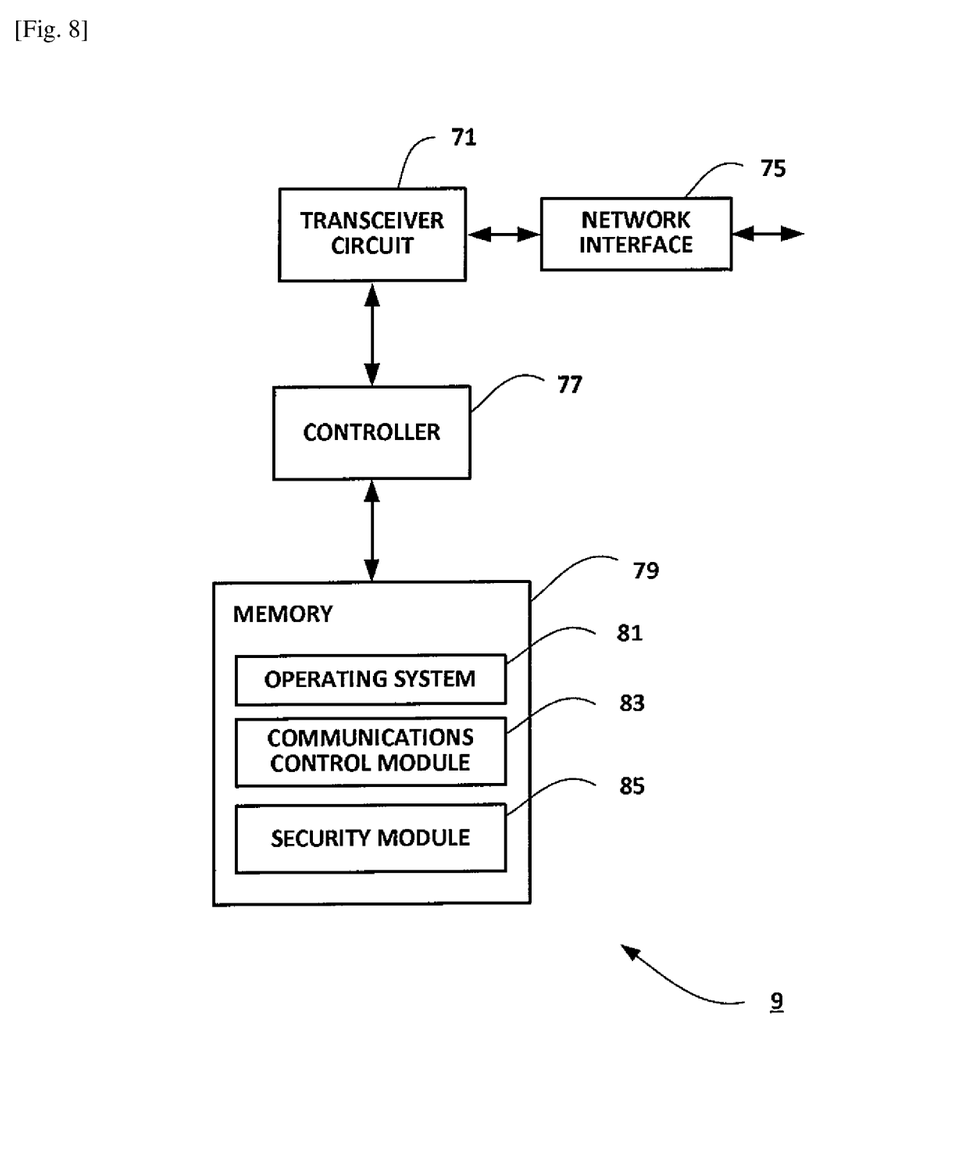
FIG. 8 is a block diagram illustrating the main components of the slice security server 9 shown in FIG. 2.

FIG. 8 is a block diagram illustrating the main components of the slice security server 9 shown in FIG. 2. As shown, the slice security server 9 has a transceiver circuit 71 and a network interface 75 for transmitting signals to and for receiving signals from other nodes (including the UE 3). The slice security server 9 has a controller 77 to control the operation of the slice security server 9. The controller 77 is associated with a memory 79.

Software may be pre-installed in the memory 79 and/or may be downloaded via the communication network 1 or from a removable data storage device (RMD), for example. The controller 77 is configured to control the overall operation of the slice security server 9 by, in this example, program instructions or software instructions stored within memory 79. As shown, these software instructions include, among other things, an operating system 81, a communications control module 83, and a security module 85.

The communications control module 83 controls the communication between the slice security server 9 and other network entities that are connected to slice security server 9 (e.g. the base station/access node 5, the control plane node 6, the HSS, the slice manager 8, and the UE 3 when connected to the base station/access node 5).

The security module 85 is responsible for applying one or more set of appropriate security algorithms, procedures and/or settings corresponding to security requirements associated with the various network slices (e.g. per service).

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the slice manager, and the slice security server are described for ease of understanding as having a number of discrete modules (such as the communications control modules and the security modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

In the above embodiments, a number of software modules were described. As those skilled in the art will appreciate, the software modules may be provided in compiled or un-compiled form and may be supplied to the UE, the slice manager, and the slice security server as a signal over a computer network, or on a recording medium. Further, the functionality performed by part or all of this software may be performed using one or more dedicated hardware circuits. However, the use of software modules is preferred as it facilitates the updating of the UE, the slice manager, and the slice security server in order to update their functionalities.

Various other modifications will be apparent to those skilled in the art and will not be described in further detail here.

LIST OF ABBREVIATIONS

TABLE 1

| | |
|---|---|
| 3PSP | 3rd Party Service Provider |
| API | Application Programming Interface |
| AS | Application Server |
| AuC | Authentication Center |
| CPE | Control Plane Entity |
| eNB | Evolved NodeB |
| GGSN | Gateway GPRS Support Node |
| GPRS | General Packet Radio Service |
| HLR | Home Location Register |
| HO | Handover |
| HSS | Home Subscriber Server |
| IMSI | International Mobile Subscriber Identifier |
| IP | Internet Protocol |
| IWF | Interworking Function |
| LAI | Location Area Identifier |
| LAU | Location Area Update |
| LTE | Long Term Evolution |
| MGW | Media Gateway |
| MME | Mobility Management Entity |
| MSC | Mobile Switching Centre |
| MSC-S | MSC-Server |
| MTC | Machine Type Communication |
| NAS | Non Access Stratum |
| NW | Network |
| PCEF | Policy Control Enforcement Function |
| PCRF | Policy Control Rule Function |
| PDN | Packet Data Network |
| PGW | PDN Gateway |
| PLMN | Public Land Mobile Network |
| QoS | Quality of Service |
| RAE | Radio Access Entity |
| RRC | Radio Resource Control |
| SCEF | Service Capability Exposure Function |
| SCS | Service Capability Server |
| SGSN | Serving GPRS Support Node |
| SGW | Serving Gateway |
| SP | Service Provider |
| SSS | Slice Security Server |
| UE | User Equipment |
| UPE | User Plane Entity |
| URI | Uniform Resource Identifier |

LIST OF REFERENCES

[1] 3GPP TS 23.401 "General Packet Radio Service (GPRS) enhancements for Evolved Universal Terrestrial Radio Access Network (E-UTRAN) access", v13.6.0, 2016 Mar. 15

[2] 3GPP TS 24.301 "Non-Access-Stratum (NAS) protocol for Evolved Packet System (EPS); Stage 3", v 13.5.0, 2016 Mar. 18

[3] 3GPP TS 33.401 "3GPP System Architecture Evolution (SAE); Security architecture", v 13.2.0, 2016 Mar. 17

[4] 3GPP TR 23.799 "Study on Architecture for Next Generation System", v0.2.0, 2016 Feb. 10

[5] 3GPP TR 22.891 "Study on New Services and Markets Technology Enablers", v14.0.0, 2016 Mar. 18

Various other modifications will be apparent to those skilled in the art and will not be described in further detail here.

(Supplementary Note 1) A security device used in a mobile network comprising:
a memory to store slice security requirements which are different for each slice ID, the slice ID indicating a network slice in a core network; and
a transmitter to transmit the slice security requirements to a network device used in the mobile network in response to a request for selecting a security algorithm for the network slice.

(Supplementary Note 2) A network device used in the mobile network comprising:
a transmitter to transmit, to a security device used in the mobile network, a Slice Security Request including a slice ID which indicates a network slice in a core network;
a receiver to receive, from the security device, a Slice Security Response including slice security requirements related to the slice ID; and
a controller to select, based on the slice security requirements, a security algorithm for the network slice.

(Supplementary Note 3) The network device according to the supplementary note 2, further comprising: a processor to create an Authentication Vector based on the slice security requirements.

(Supplementary Note 4) A mobile network system comprising:
a security device; and
a network device; wherein
the security device is configured to store slice security requirements which are different for each slice ID, the slice ID indicating a network slice in a core network, and
the network device is configured to transmit, to the security device, a Slice Security Request including the slice ID, to receive, from the security device, a Slice Security Response including the slice security requirements related to the slice ID, and to select, based on the slice security requirements, a security algorithm for the network slice.

(Supplementary Note 5) The mobile network system according to the supplementary note 4, wherein the network device creates an Authentication Vector based on the slice security requirements.

(Supplementary Note 6) A security separation method for a security device used in a mobile network, the method comprising:
storing slice security requirements which are different for each slice ID, the slice ID indicating a network slice in a core network; and
transmitting, to a network device used in the mobile network, the slice security requirements in response to a request for selecting a security algorithm for the network slice.

(Supplementary Note 7) A security separation method for a network device used in the mobile network, the method comprising:
transmitting, to a security device used in the mobile network, a Slice Security Request including a slice ID which indicates a network slice in a core network;
receiving, from the security device, a Slice Security Response including slice security requirements related to the slice ID; and
selecting, based on the slice security requirements, a security algorithm for the network slice.

(Supplementary Note 8) A security separation method for a mobile network system including a security device and a network device, the method comprising:
storing, by the security device, slice security requirements which are different for each slice ID, the slice ID indicating a network slice in a core network;
transmitting, by the network device, a Slice Security Request including the slice ID to the security device;
receiving, by the network device, a Slice Security Response including the slice security requirements related to the slice ID from the security device; and
selecting, by the network device, based on the slice security requirements, a security algorithm for the network slice.

(Supplementary Note 9) An authentication method for a mobile network system including a security device as part of a network device, the method comprising:
storing slice security requirements which are different for each slice ID, the slice ID indicating a network slice in a core network; and
selecting, based on the slice security requirements, a security algorithm for the network slice.

(Supplementary Note 10) The authentication method according to the supplementary note 9, further comprising: creating an Authentication Vector based on the slice security requirements.

(Supplementary Note 11) A non-transitory computer-readable recording medium storing therein a program to cause a computer to execute the processing comprising:
storing slice security requirements which are different for each slice ID, the slice ID indicating a network slice in a core network; and
transmitting, to a network device used in the mobile network, the slice security requirements in response to a request for selecting a security algorithm for the network slice.

(Supplementary Note 12) A non-transitory computer-readable recording medium storing therein a program to cause a computer to execute the processing comprising:
transmitting, to a security device used in the mobile network, a Slice Security Request including a slice ID which indicates a network slice in a core network;
receiving, from the security device, a Slice Security Response including slice security requirements related to the slice ID; and
selecting, based on the slice security requirements, a security algorithm for the network slice.

This application is based upon and claims the benefit of priority from European Patent Application No. EP16275069.9, filed on Apr. 29, 2016, the disclosure of which is incorporated herein in its entirety by reference.

The invention claimed is:
1. A network node used in a mobile network comprising:
a transmitter to transmit, to a security server used in the mobile network, a Slice Security Request including a slice ID provided by user equipment, the slice ID indicating a network slice in a core network;
a receiver to receive, from the security server, a Slice Security Response including slice security requirements related to the slice ID; and
a processor to create, based on the slice security requirements, an Authentication Vector per slice ID,
wherein the transmitter transmits, to a control plane node used in the mobile network and to perform authentication and key agreement for user equipment, said Authentication Vector for selecting a security algorithm for integrity and ciphering per slice ID.

2. A mobile network system comprising:
a security server comprising a memory to store slice security requirements which are different for each slice ID indicating each network slice in a core network; and
a network device node comprising a transmitter to transmit, to the security server, a Slice Security Request including a slice ID provided by user equipment, and to receive, from the security node, a Slice Security Response including the slice security requirements related to the slice ID, and a processor to create, based on the slice security requirements, an Authentication Vector per slice ID; and
a control plane node comprising a processor to perform authentication and key agreement for user equipment wherein the network node transmits, to the control plane node, said Authentication Vector, and
wherein the control plane node selects
a security algorithm for integrity and ciphering per slice ID based on said Authentication Vector.

3. A security separation method for a network node used in a mobile network, the method comprising:
transmitting, to a security server used in the mobile network, a Slice Security Request including a slice ID provided by user equipment, the slice ID indicating a network slice in a core network;
receiving, from the security server, a Slice Security Response including slice security requirements related to the slice ID;
creating, based on the slice security requirements, an Authentication Vector per slice ID; and transmitting, to a control plane node used in the mobile network and to perform authentication and key agreement for user equipment, said Authentication Vector for selecting a security algorithm for integrity and ciphering per slice ID.

4. A security separation method for a mobile network system including a security server a network node and a control plane node, the method comprising:
storing, by the security server, slice security requirements which are different for each slice ID, indicating each network slice in a core network;
transmitting, by the network node, a Slice Security Request including a slice ID provided by user equipment to the security server;
receiving, by the network node, a Slice Security Response including the slice security requirements related to the slice ID from the security server;
creating, by the network node, based on the slice security requirements, an Authentication Vector per slice ID;
transmitting, by the network node, to the control plane node, said Authentication Vector; and
selecting, by the control plane node, a security algorithm for integrity and ciphering per slice ID based on said Authentication Vector.

* * * * *